United States Patent

[11] 3,631,261

[72] Inventor Gary L. Heimbigner
Anaheim, Calif.
[21] Appl. No. 52,403
[22] Filed July 6, 1970
[45] Patented Dec. 28, 1971
[73] Assignee North American Rockwell Corporation
Anaheim, Calif.

[54] COMPACT LAYOUT FOR MULTIPHASE SHIFT REGISTER
10 Claims, 6 Drawing Figs.

[52] U.S. Cl. 307/221 C, 307/205, 307/208, 307/279
[51] Int. Cl. G11c 19/00
[50] Field of Search 307/221 C, 205, 251, 304, 279, 208

[56] References Cited
UNITED STATES PATENTS

| | | | |
|---|---|---|---|
| 3,395,292 | 7/1968 | Bogert | 307/279 X |
| 3,497,715 | 2/1970 | Yen | 307/221 C |
| 3,518,451 | 6/1970 | Booher | 307/221 C |
| 3,524,077 | 8/1970 | Kaufman | 307/251 X |

*Primary Examiner*—John S. Heyman
*Attorneys*—L. Lee Humphries, H. Fredrick Hamann and Robert G. Rogers

ABSTRACT: A field effect transistor shift register gated by a multiphase clocking scheme is layed out on a semiconductor substrate so that adjacent half bits of a single tiered and corresponding half bits of a multitiered shift register time share certain clocking lines during the output precharge and input evaluation phases of an operating cycle of a half-bit stage. The time sharing of the clocking lines enables the corresponding half-bit stages of a multitiered shift register to time share field effect transistor devices.

INVENTOR
GARY L. HEIMBIGNER

BY Robert G. Rogers

ATTORNEY

INVENTOR.
GARY L. HEIMBIGNER

BY Robert G. Rogers

ATTORNEY

INVENTOR.
GARY L. HEIMBIGNER

BY Robert G. Rogers

ATTORNEY

COMPACT LAYOUT FOR MULTIPHASE SHIFT REGISTER

BACKGROUND OF THE INVENTION

1. Field of the Invention

The invention relates to a multiphase shift register layout in compact form on a semiconductor chip and more particularly to such s shift register which certain clocking lines and certain field effect transistor devices are time shared during the output precharge and input evaluation phases of the shift register operating cycle for enabling a reduction in the area required on a semiconductor chip for single and/or multi tiered shift registers.

2. Description of Prior Art pp FIG. 1 is an example of a single-tiered shift register 1 gated by minor (single width) and major (double width) clock signals of a multiphase clocking scheme. Each half-bit stage 2 and 3 of the shift register requires different clock signals for the output precharge and the input evaluation phases. For example, half-bit stage 2 uses the $\Phi_1$ clock signal for turning field effect transistor 4 on when precharging output capacitor 5 of output 6 for the first half-bit stage. In addition, the $\Phi_1$ clock signal grounds the bottom terminal 10 of the half-bit stage 2 during $\Phi_2$ i.e. when $\Phi_2$ is true, for evaluating input on terminal 11. The half-bit stage 3 uses the clock signal $\Phi_3$ for turning on field effect transistor devices 7 when precharging the output capacitor 8 at the output 9 for half-bit stage 3.

The $\Phi_1$ clock is false during the $\Phi_2$ time of the major clock signal $\Phi_{1+2}$. During $\Phi_2$, field effect transistor device 12 is turned on. As a result, if the input on terminal 11 is true, field effect transistor device 13 is turned on and the charge on capacitor 5 is discharged to the electrical ground level provided by the $\Phi_1$ clock on terminal 10. In effect, field effect transistor 13 is a two-terminal logical network comprising terminals 10 and 14.

In the half-bit stage 3, the Φ3 clock is used to evaluate the inputs. During $\Phi_4$, field effect transistor 15 is turned on so that the upper terminal 16 of the logical network implemented by field effect transistor 17 is connected to output 9. The lower terminal 18 of the logical network is connected to Φ3 clock signal which is at an electrical ground level during $\Phi_4$ timed. If the input on terminal 19 of the half-bit stage 3 is true, the charge on capacitor 8 discharges to the electrical ground voltage level.

From the above description, it should be obvious that each half-bit stage uses one clock signal i.e., $\Phi_1$ for precharging the output capacitor and the same clock signal for evaluating the inputs to the half-bit stage. The adjacent half-bit stage uses a phase-separated clock signal i.e. $\Phi_3$, for precharging and evaluating.

A typical layout for a (prior art) shift register is shown in FIG. 2. The FIG. 2 layout includes upper and lower tiered shift register stages 20 and 21. In a practical layout, more than one tier of a shift register is layed out, or produced, on a single semiconductor chip.

The FIG. 2 embodiment illustrates lower tier 20 and upper tier 21. A third tier 22 is also partially shown. Tier 20 includes half-bit stage 23 and half-bit stage 24. Half-bit stages 25 and 26 of tier 21 correspond to the half-bit stages 23 and 24 of tier 20. Partially shown half-bit stages 27 and 28 of tier 22 correspond to half-bit stages 23 and 24 of tier 20.

It is pointed out that the contact 31 is electrically connected to half-bit stages 23 and 25. The lower contact 32 of half-bit stage 23 is the upper terminal of half-bit stage 27. The $\Phi_1$ clock is provided to half-bit stages 25 and 23 on conducting metal strip 29 which contacts semiconductor region of half-bit stage 25 through contact 31.

The connecting metal strip 29 is expanded at region 32 to provide the gate electrode for the load field effect transistor (see transistor 4). Metal contact 33 corresponds to the output 6 of FIG. 1 and expanded metal region 34 corresponds to the gate electrode of field effect transistor 17 of FIG. 1.

The $\Phi_3$ clock signal is provided to the half-bit stage 24 corresponding to half-bit stage 3 of FIG. 1 on connecting metal strip 35 which is expanded at region 36 to provide the gate electrode for the load device of upper tier 21. Conducting strip 35 contacts the semiconductor region 37 by metal contact 38. The region between contact 38 and gate electrode 34 is made relatively long for enabling the metal strip 29 to cross over the region 37 as shown.

A relatively thick insulating layer such as $SiO_2$, if the semiconductor material is silicon, is formed over the region 37 for preventing the clock signal, $\Phi_1$, on conducting strip 29 from affecting the operation of half-bit stage 24. Similarly, the region 30 of half-bit stage 25 is made relatively long to enable the conducting strip 35 to pass over the region 30 for making contact with region 37. A relatively thick insulating layer is also provided under the strip 35 to prevent the clock signal $\Phi_3$ from affecting the operation of half-bit stage 25.

As an example of the layout area required using a 0.5×0.5 mil grid system, the half-bit stage of tier 20 requires approximately 6.5 mils between the upper and lower terminals as measured between contact 39 and 38 of half-bit stage 24. The layout shown is not exactly to scale.

Although the remaining contacts, semiconductor regions, etc. of the shift register shown in FIG. 2 could be compared with the corresponding elements of FIG. 1, it is not believed necessary. The significant corresponding elements have been described. It is important to note the layout area required for one shift register half-bit stage.

It would be preferred if the layout area required for a shift register using single and/or multitiered shift register stages could be reduced. A reduction in area would improve the producibility and/or allow the fabrication of functionally larger shift registers. For example, if the area could be significantly reduced, a 2000-bit shift register could be layed out in approximately the same semiconductor chip area as presently used for a 1000-bit shift register. The present invention provides a shift register and a layout which results in a substantial reduction in the required layout area. For example, by using the shift register described subsequently herein, the layout area for each one half-bit stage can be reduced by approximately 23 percent.

SUMMARY OF THE INVENTION

Briefly, the invention comprises a compact shift register and layout for both single tiered and multitiered shift register stages in which the output precharge clock signal and input evaluation clock signal are time shared and used for alternate functions by adjacent half-bit stages of a single tiered shift register and for like functions by corresponding half-bit stages of multitiered shift register stages. As a result of time sharing the clock signals and by using the clock signals to perform alternate functions, the load field effect transistors of corresponding half-bit stages of a multitiered shift register can also be time shared as can be the contacts at the terminals of corresponding half-bit stages opposite the load field effect transistor of a multitiered shift register. By time sharing clock signals and using the clock signals for alternate functions, so that certain transistor devices and conducting regions can also be time shared, substantially less area is required for laying out a half-bit stage of a single-tiered shift register and for laying out corresponding half-bit stages of a multitiered shift register on the same semiconductor chip.

Therefore, it is an object of this invention to provide a compact multiple phase shift register and compact layout for the register.

It is another object of this invention to provide an improved layout for single-tiered and a multitiered shift register stages in which certain elements of the shift register half-bit stages are time shared.

A still further object of this invention is to provide an improved compact layout scheme for a multiple phase shift register in which certain clock signals and clock signal lines are time shared and used for alternate functions by adjacent half-bit stages of a single-tiered shift register and by corresponding half-bit stages of a multitiered shift register.

A still further object of this invention is to provide a compact shift register in which certain field effect transistors implementing the shift register are time shared by corresponding half-bit stages of a multitiered shift register and in which clock signal lines are time shared between adjacent half-bit stages of a single-tiered multiple phase shift register.

A still further object of this invention is to provide a relatively reduced area for one bit of a multiple phase shift register for improving the producibility and/or for permitting the fabrication of functionally larger shift registers in the same semiconductor chip area formally required by other shift register layout schemes.

A further object of this invention is to provide a field effect transistor shift register gated by multiple phase clocking signals in which the load field effect transistor of adjacent half-bit stages of a multitiered shift register are time shared and in which the clock line and connecting regions for the opposite terminal of adjacent half-bit stages of a multitiered shift register on time shared.

A further object of this invention is to provide a field effect transistor shift register gated by multiple phase clock signals in which one clock signal is used for precharging the output of one-half-bit stage and for evaluating the inputs of an adjacent half-bit stage so that the clock signal line can be time shared by half-bit stages of the shift register.

These and other objects of this invention will become more apparent when taken in connection with the description of the drawings, a brief description of which follows:

BRIEF DESCRIPTION OF PREFERRED EMBODIMENTS

Figure 3:
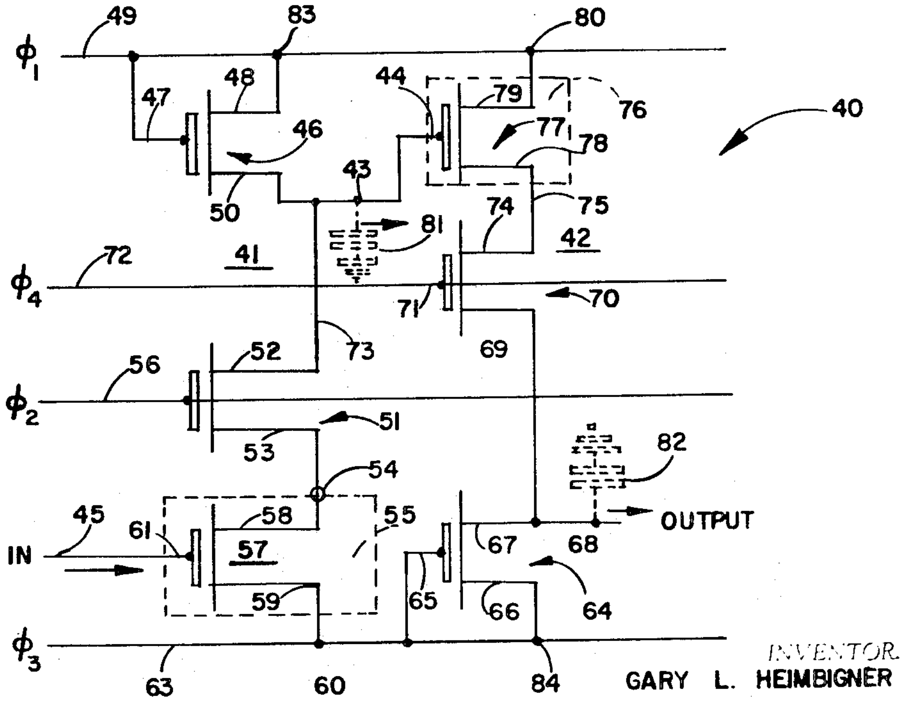
FIG. 3 is a schematic diagram of an improved shift register in which certain clock signals are time shared and used for alternate functions by adjacent half-bit stages of the shift register.
Figure 2:
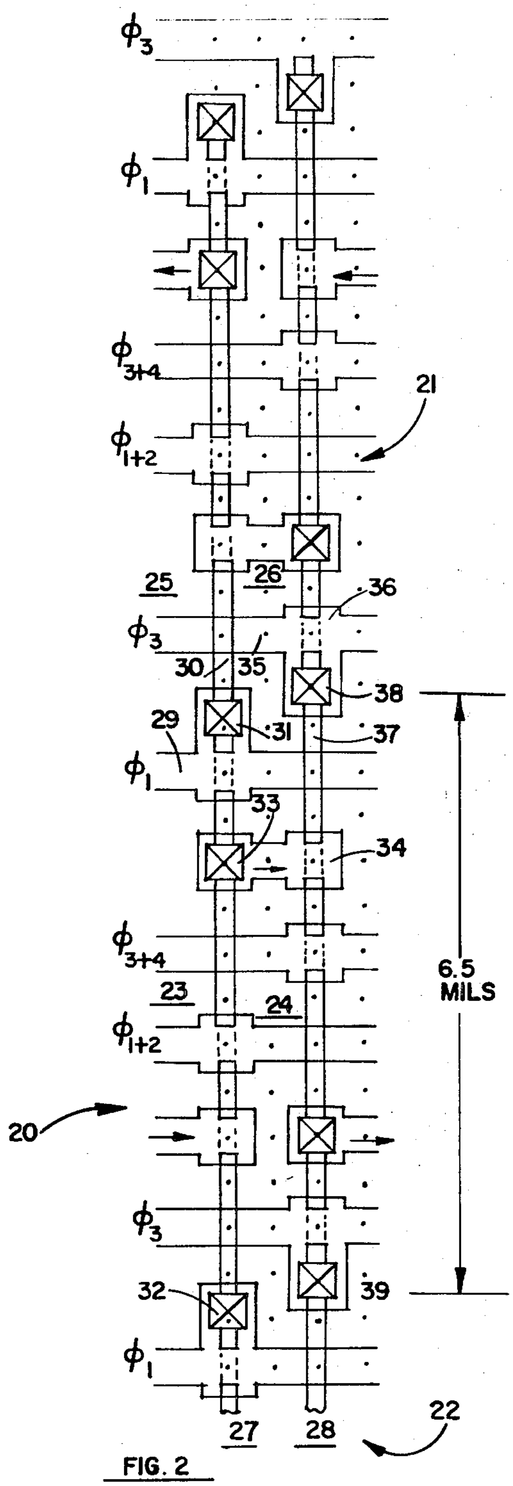
FIG. 2 (PRIOR ART)
FIG. 2 is an actual layout on a semiconductor chip of one stage of a multitiered shift register corresponding to the FIG. 1 schematic diagram.

FIG. 3 is a schematic diagram of stage 40 of a single-tiered shift register. The stage 40 comprises half-bit stage 41 and adjacent half-bit stage 42. The output 43 of half-bit stage 41 comprises an input 44 to half-bit stage 42. An input 45 is provided for half-bit stage 41. Input 45 could be provided from a preceding half-bit stage or from an external source.

For purposes of describing one embodiment of the invention, P-type, or P-channel, field effect transistors are used. As a result, clock signals alternating between electrical ground and a negative voltage level in excess of the threshold voltage levels of the field effect transistors being gated are used. Electrical ground indicates a false logical level and the negative voltage level indicates a true voltage level.

Field effect transistors include MOS, MNOS, silicon gate and other gate controlled field effect devices. It is pointed out that N-type field effect transistors can also be used within the scope of the invention. In that case, the clock signals alternate between electrical ground and a positive voltage level. In still other embodiments, both P-type and N-type field effect transistors can be used to implement the shift registers as shown and described herein.

Half-bit stage 41 comprises load field effect transistor 46 having its gate electrode 47 and its drain electrode 48 connected to the $\Phi_1$ clock input line 49. The source electrode 50 is connected to the output 43.

Isolation field effect transistor 51 has its drain electrode 52 connected to the output 43 and its source electrode 53 connected to the upper terminal 54 of the two terminal logical network 55. A gate electrode 56 of field effect transistor 51 is connected to the $\Phi_2$ clock input line.

The logical network 55 is shown as implemented by field effect transistor 57 having its drain electrode 58 connected to upper terminal 54 and its source electrode 59 connected to lower terminal 60. The gate electrode 61 is connected to the input 45. The lower terminal 60 of the logic network is connected to the $\Phi_3$ clock input line 63.

It is pointed out that the logical network 55 could be implemented by one or more field effect transistors for providing various logical combinations. For example, AND, OR, NAND/OR, networks can be implemented by field effect transistors.

Half-bit stage 42 comprises a load field effect transistor 64 having its gate electrode 65 and drain electrode 66 connected to the $\Phi_3$ clock input line 63. The source electrode 67 is connected to the output 68 and to drain electrode 69 of isolation field effect transistor 70.

Isolation field effect transistor 70 has its gate electrode 71 connected to the $\Phi_4$ clock input line 72. It is pointed out that the clock input line 72 must pass over the P-region of half-bit stage 41 represented by line 73. The source electrode 74 of isolation field effect transistor 70 is connected to the upper terminal 75 of logical network 76. Logical network 76 is implemented by single field effect transistor 77 having its drain electrode 78 connected to upper terminal 75, and its gate electrode 44 connected to the output 43 of the preceding half-bit stage 41. The gate electrode 44 also provides the input to the half-bit stage 42. The source electrode 79 of field effect transistor 77 is connected to the lower terminal 80 of the logical network 76. The lower terminal 80 is connected to the $\Phi_1$ clock input line 49.

It is pointed out that the clock lines also provide gating signals for succeeding stages (not shown) and that the output of the half-bit stage 42 provides an input to a succeeding stage (not shown). The exact number of stages depends upon a particular application. A shift register may consist of one or more stages. One-half-bit stage of a shift register is an inverter stage.

The output 43 includes capacitance 81 for storing a charge approximately equal to the negative voltage level $\Phi_1$ when $\Phi_1$ is true. Output 68 includes capacitor 82 for storing a charge approximately equal to the negative voltage level of $\Phi_3$ when $\Phi_3$ is true.

Figure 1:
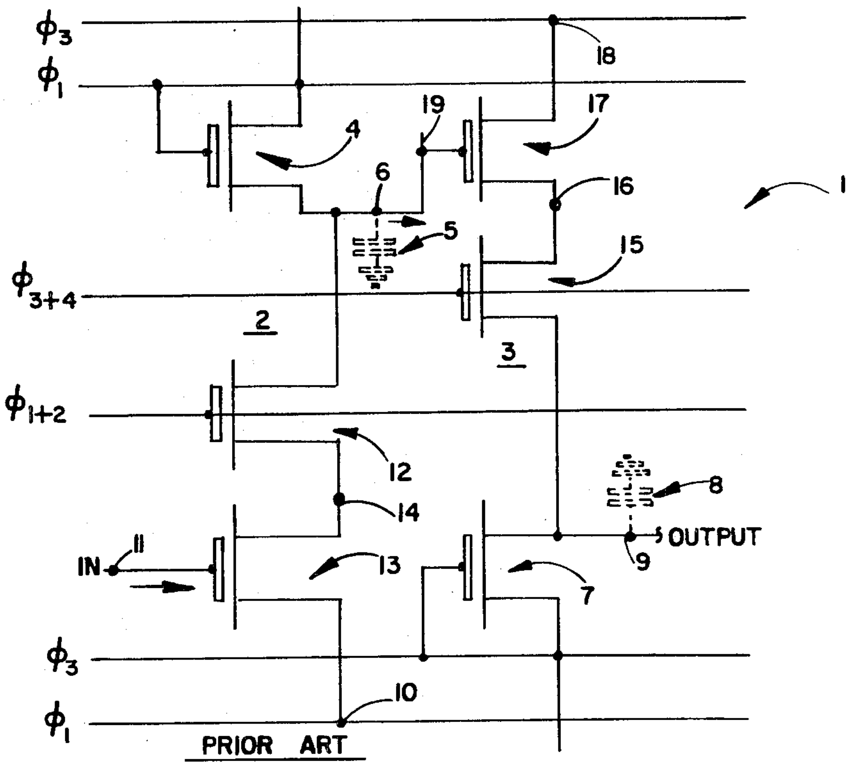
FIG. 1 is a schematic diagram of one stage of a prior art shift register.

It is pointed out that in the prior art shift register, (see FIG. 1), the lower terminal of the half-bit stage 2 was connected to the same clock signal, $\Phi_1$, as was the upper terminal. Similarly, the upper and lower terminals of the half-bit stage 3 were connected by clock signal $\Phi_3$. It is also pointed out that the isolation transistors 12 and 15 of the half-bit stages 2 and 3 were driven by major clock signal $\Phi_{1+2}$ and $\Phi_{3+4}$, respectively.

In the FIG. 3 compact shift register the upper terminal 83 of half-bit stage 41 is connected to clock signal $\Phi_1$ and the lower terminal 60 is connected to clock signal $\Phi_3$. The lower terminal 80 of half-bit stage 42 is connected to the same clock signal $\Phi_1$ as is used by the upper terminal of a half-bit stage 41. Clock signal $\Phi_3$ is connected to the lower terminal 60 of half-bit stage 41 and upper terminal 84 of half-bit stage 42. The phase relationship of the clock signals $\Phi_1$ and $\Phi_2$ as well as other clock signals $\Phi_3$ and $\Phi_4$ is shown in FIG. 5.

Figure 5:
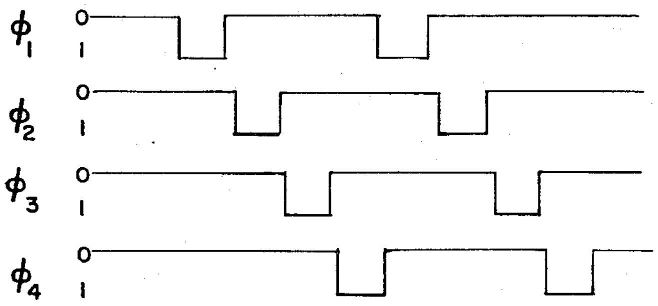
FIG. 5 is a diagram showing the phase relationship between clock signals.

In FIG. 5, $\Phi_1$ is seen to occur first in the operating clocking cycle which includes four phases implementing a multiple phase clocking scheme. The clocking scheme utilizes single width, or minor clock signals. When the $\Phi_1$ clock signal is true i.e. negative, the $\Phi_3$ clock signal is false i.e. electrical ground. The $\Phi_1$ and $\Phi_3$ clock signals therefore are never true at the same time. Similarly, the $\Phi_2$ and $\Phi_4$ clock signals are never true when the $\Phi_1$ and $\Phi_3$ clock signals are true.

In operation, when the $\Phi_1$ clock signal is true, field effect transistor 46 of half-bit stage 41 turns on and capacitance 81 of output 43 is charged to approximately the negative voltage level of $\Phi_1$. Since $\Phi_2$ is false during $\Phi_1$, field effect transistor 51 is turned off for isolating the logical network 55 from the $\Phi_1$ clock signal and isolating the output 43 from the input 45 to the logical network, The bottom terminal 60 of the logical network 55, which is also the bottom terminal of the half-bit stage 41, is connected to clock signal $\Phi_3$ on line 63. Clock signal $\Phi_3$ is false during $\Phi_1$ time.

If the field effect transistor 51 was allowed to remain on during $\Phi_1$ time, it would be possible to provide a low resistance electrical path between line 49 and lines 63. However, since field effect transistor 51 is off, the clock signal $\Phi_3$ which is false during $\Phi_1$ time can be used on line 63 and applied to the lower terminal of logical network 55.

At the end of $\Phi_1$ time, the capacitance 81 is charged unconditionally true. The $\Phi_1$ phase time is usually referred as the output precharge phase. During the precharge period the output capacitance which may be a discrete or effective capacitance comprising the inherent capacitance at the output is unconditionally charged without regard to the condition of the input signal since the input terminal is isolated from the output terminal.

During $\Phi_2$ time field effect transistor 46 turns off and field effect transistor 51 turns on to connect the output terminal 43 to the upper terminal 54 of logical network 55. If the logical network 55 is true i.e. if the input signal is true, or negative, a relatively low resistance electrical path exists between output terminal 43 and the lower terminal 60 of the logical network 55, which is connected to line 63. Clock signal $\Phi_3$ on line 63 is electrical ground during $\Phi_2$ time as shown by FIG. 5. Therefore, if the input signal is true the capacitance 81 is discharged to the electrical ground level on line 63 and the output changes from a true voltage level to a false voltage level i.e. from a first logical level to a second logical level.

The $\Phi_2$ phase is often called the input evaluation phase. In other words, the logical state of the input signals to the half-bit stage are evaluated during $\Phi_2$ time. If the input signals are true the output changes from a negative to electrical ground voltage level, whereas if the input is false the output remains charged to a negative voltage level.

The half-bit stage 42 operates in substantially the same manner. The load field effect transistor 64 is turned at $\Phi_3$ time which occurs at the end of the $\Phi_2$ time. When load field effect transistor 64 is on, capacitance 82 of the output 68 is unconditionally charged true i.e. the output capacitance 82 is precharged during $\Phi_3$ time. It is pointed out that during $\Phi_3$ time, $\Phi_1$ and $\Phi_2$ clock signals are false so that the negative voltage level of $\Phi_3$, applied to the lower terminal 60 of logical network 55 of half-bit stage 41, does not interfere with the operation of the first half-bit stage 41.

At the end of $\Phi_3$ time, the $\Phi_4$ clock signal becomes true as shown in FIG. 5 and field effect transistor 70 is turned on to connect the output 68 to the upper terminal 75 of logical network 76. If the logical network is true i.e. if output 43 remained true after $\Phi_2$ time, field effect transistor 77 is turned on for providing an electrical path from output 68 to the $\Phi_1$ clock line 49. $\Phi_1$ is at electrical ground during $\Phi_4$ time so that if logical network 76 is true during $\Phi_4$, capacitance 81 discharges as indicated in connection with description of operation of half-bit stage 41. The fact that line 49 is at electrical ground during $\Phi_4$ does not effect the operation of the half-bit stage 41 since the next precharge interval of half-bit stage 41 is the $\Phi_1$ true interval which is the beginning of the next cycle of operation for stage 40.

Therefore, it should be obvious that although one half-bit stage 2 of the prior art shift register required a $\Phi_1$ clock signal for precharging its output and a $\Phi_1$ clock signal for evaluating inputs, it is possible to use different clock signals i.e. $\Phi_1$ as the precharge clock signal and $\Phi_3$ as the evaluation clock signal for precharge and evaluation. In addition, although adjacent one half-bit stage 3 of the prior art shift register use $\Phi_3$ clock signal as its precharge clock and the same i.e. $\Phi_3$, clock signal as its evaluation clock signal, it is possible for adjacent half-bit stages to use different clock signals for precharge and evaluation.

In other words, it is possible to use the evaluation clock signal $\Phi_3$ of half-bit stage 41 as the precharge clock signal for half-bit stage 42. It is also possible as indicated in connection with the description of operation, to use the precharge lock signal, $\Phi_1$ for half-bit stage 41, as the evaluation clock signal for half-bit stage 42, the adjacent half-bit stage. Stated alternately, the $\Phi_1$ clock signal and the $\Phi_1$ clock signal line 49 are time shared by half-bit stages 41 and 42 although the clock signal functions are different for each half-bit stage. Similarly, the $\Phi_3$ clock signal and the $\Phi_3$ clock signal line 63 are time shared by the half-bit stages 41 and 42 although the functions of the clock signal are different for each half-bit stage.

Figure 4:
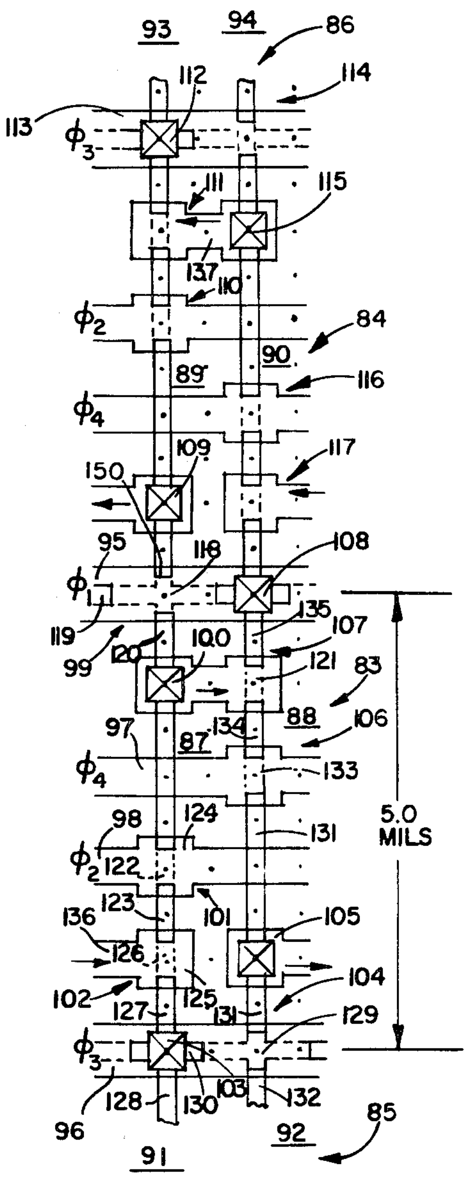
FIG. 4 is an actual layout on a semiconductor chip of a multitiered shift register stage corresponding to the FIG. 3 schematic diagram.

The significance of time sharing the clock signal lines and the clock signals becomes even more significant when considered in connection with the compact layout of a multitiered shift register illustrated by the FIG. 4 arrangement. FIG. 4 illustrates a compact layout for tiers 83, 84, 85 (partially shown), and 86 (partially shown) of a multitiered shift register comprising half-bit stages 87, 88, 89, 90, 91, 92, 93, 94; respectively.

The $\Phi_1$ clock signal line 95 corresponds to the clock signal line 49 of FIGS. 3. The $\Phi_3$ clock signal line 96 corresponds to clock signal line 63 of FIG. 3. The $\Phi_4$ clock signal line 97 corresponds to clock signal line 72 of FIG. 3 and the $\Phi_2$ clock signal line 98 corresponds to the $\Phi_2$ clock signal line at the gate electrode 56 of isolation field effect transistor 51.

The half-bit stage 87 comprises load field effect transistor 99 (equivalent to load field effect transistor 46 in FIG. 3) connected between $\Phi_1$ clock line 95 and output 100 (equivalent to output 43 in FIG. 3); isolation field effect transistor 101 (equivalent to isolation field effect transistor 51 in FIG. 3); field effect transistor 102 (equivalent to two terminal networks 55 in FIG. 3); lower contact 103 (equivalent to contact 60 in FIG. 3); and the $\Phi_3$ clock line 96.

A similar comparison between half-bit stage 88 and half-bit stage 42 should be obvious. Half-bit stage 88 comprises load field effect transistor 104 connected between the $\Phi_3$ clock line 96 and output 105; isolation field effect transistor 106 connected between output 105 and field effect transistor 107 (equivalent to two terminal network 76 in FIG. 3); and lower contact 108, connected to the $\Phi_1$ clock signal line 95.

Half-bit stage 89, corresponding to half-bit stage 87, comprises load field effect transistor 99 (time shared with 87); output 109; isolation field effect transistor 110; field effect transistor 111 (two terminal logical network); and contact 112 to the $\Phi_3$ clock signal line 113. The contact 112 and clock signal line 113 are time shared by half-bit stage 93. Similarly, contact 103 of half-bit stage 87 is time shared with half-bit stage 91.

Half-bit stage 90, corresponding to half-bit stage 88, comprise load field effect transistor 114 connected between clock signal line 113 (time shared with half-bit stage 89 for alternate function) and output 115; isolation field effect transistor 116 connects between output 115 and field effect transistor 117; and lower contact 108 on the other side of transistor 117 (time shared with half-bit stage 90 of tier 84 and half-bit stage 89 for alternate function). It is pointed out that load field effect transistor 104 of stage 88 is time shared by half-bit stage 92 of tier 85.

For purposes of describing the FIG. 4 embodiment, it is assumed the transistors are P-type field effect transistors in a silicon semiconductor chip. Load field effect transistor 99 includes gate electrode 118 over the gate channel in the semiconductor material. P-regions 119 and 150 form the drain and source region for transistor 99 in connection with stage 89.

P-region 120 extends under and is contacted by output contact 100. The output extends over and is insulated from the semiconductor chip surface to provide an input to gate electrode 121 of transistor 107 of stage 88. A relatively thick $SiO_2$ layer may be used as an insulator. A relatively thin $SiO_2$ layer is provided under the gate electrodes. The metal contacts are in direct contact with the P-region.

P-region 120 also provides the drain region for transistor 101. Channel 122 separates region 120 from P-region 123. Gate electrode 124 covers region 122 for forming field effect transistor 101.

P-region 123 extends to gate electrode 125 of transistor 102. Channel 126 separates region 123 from P-region 127 which is contacted by metal contact 103. Contact 103 electrically connects the $\Phi_3$ clock signal via line 96 to P-region 127 and to P-region 128 of half-bit stage 91.

Similarly, load field effect transistor 104 includes gate electrode 129 comprising part of the $\Phi_3$ clock line 96 over an N-region in the semiconductor chip. The N-region separates P-region 130 and 131 forming the drain and source region of transistor 104. Drain region 130 is electrically connected to clock line 96 via contact 103 as shown schematically in FIG. 4. In FIG. 3 the drain 66 and gate 65 are shown connected to clock line 63.

The N-region also separates P-region 132 from region 130 of transistor 104. As a result of laying out the gate electrode in the manner shown, the transistor is time shared by half-bit stages 92 and 88.

P-region 131 is contacted by output contact 105 and provides the drain region for transistor 106. Gate electrode 133 separates the drain region 131 from source P-region 134 which is the same as the drain region for transistor 107. Gate electrode 121 of transistor 107 receives an input from output 100 of half-bit stage 87.

P-region 135 provides the source region for transistor 107 and is electrically connected to the $\Phi_1$ clock line 95 by metal contact 108. Metal contact 108 also connects line 95 to half-bit stage 90.

In operation, when the $\Phi_1$ clock signal is true, load field effect transistor 99 for half-bit stages 87 and 89 becomes conductive and the outputs 100 and 109 respectively, are precharged, or unconditionally set true. During $\Phi_1$ time, isolation field effect transistors 101 and 110 of half-bit stage 87 and 89 respectively are turned off for isolating the inputs 136 and 137 from the outputs 100 and 109 respectively.

Thereafter, during $\Phi_2$ time, isolation field effect transistors 101 and 110 are turned on for permitting the inputs to be evaluated. If an input is true, the corresponding output is connected to the $\Phi_3$ clock lines 96 and 113. The $\Phi_3$ clock signals are false during $\Phi_2$ time so that the charge on the output capacitances can be discharged, or conditionally reset false. In other words, if the condition of the inputs is true, the output is reset from true to false i.e. from a negative voltage level to an electrical ground voltage level.

The same type of operation, taking into account the clocking signals, occurs for half-bit stages 88 and 90 as well as for half-bit stages 93, 94 and 91, 92. For that reason it is not believed necessary to describe each operating sequence for each half-bit stage in detail.

Figure 6:
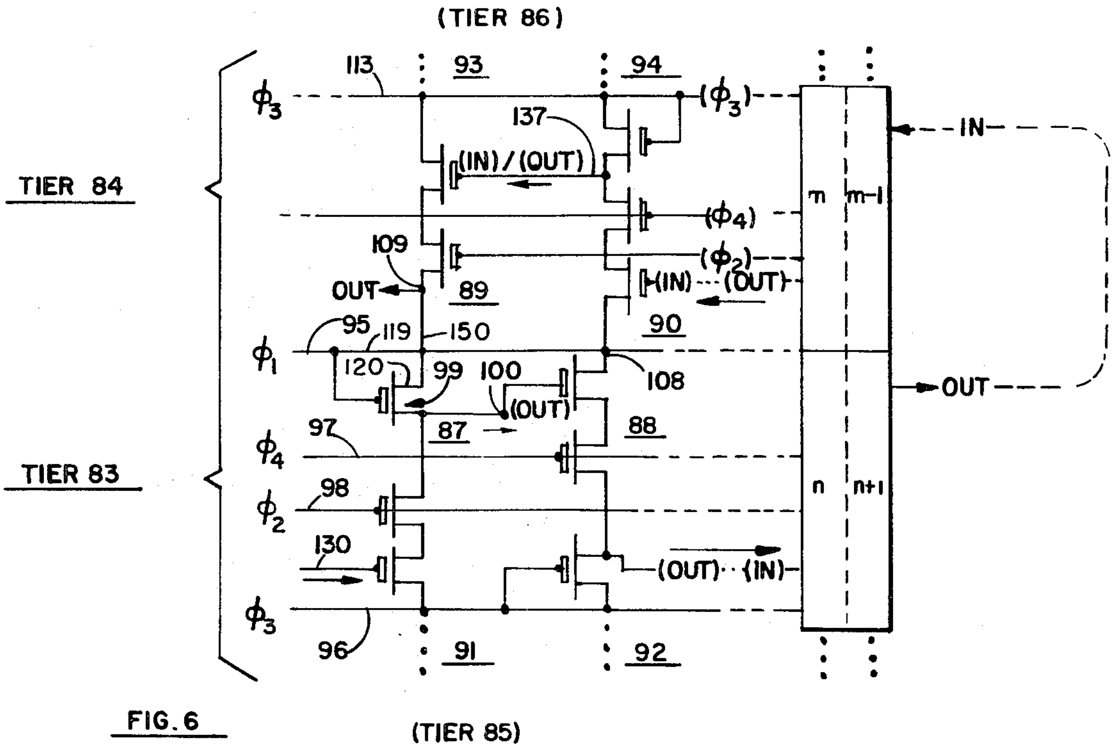
FIG. 6 is a schematic diagram of a portion of the FIG. 4 layout.

FIG. 6 is a schematic diagram of the FIG. 4 compact layout with additional half-bit stages $n$, $n+1$, $m$, and $m-1$. Load field effect transistor 99 is time shared by both half-bit stages 87 and 89. The $\Phi_1$ clock signal and clock signal line 95 is applied to the gate electrode of field effect transistor 99 as well as to contact 108 of half-bit stages 88 and 90. The $\Phi_3$ clock signal line 96 is applied to contact 103 for half-bit stage 87 and half-bit stage 91 as well as to the gate electrode for load field effect transistor 104 being time shared by half-bit stage 88 and half-bit stage 92.

Similar comparisons can be made with respect to the FIG. 6 diagram. As can be seen, the number of half-bit stages and shift register tiers of stages is limited only by the semiconductor chip area. The output from the $n+1$ half-bit stage can be used as the input to the i $m-1$ half-bit stage. The input 130 could have been provided as an output from tier 85 and the output from tier 84 could be provided as an input to tier 86.

I claim:

1. A compact multiple phase shift register comprising half-bit stages each having at least one input and an output including storage capacitance,
   - a load field effect transistor gated by a first phase clock signal for precharging the output storage capacitance to a first voltage level,
   - a two-terminal logical network having first and second terminals and comprising at least one field effect transistor having its gate electrode connected to an input which receives an input signal for controlling the electrical impedance between said terminals,
   - an isolation field effect transistor connected between said output and the first terminal of said two-terminal logical network for isolating the output from said first terminal during said first phase clock signal, and for connecting said first terminal to said output during a second phase clock signal for evaluating inputs to said logical network during said second phase clock signal,
   - said second terminal being connected to a third phase clock signal for providing a second voltage level to said second terminal during said second phase clock signal whereby said output storage capacitance may be discharged to said second voltage level through said two-terminal logic network if a relatively low impedance exists between said first and second terminals during said second phase clock signal, each of said phase clock signals being distinct in phase form each other.

2. The multiple phase shift register recited in claim 1 and further comprising precharging adjacent half-bit stage with one of its inputs being the output from said first recited half-bit stage, the output of said adjacent half-bit stage including storage capacitance, said adjacent half-bit stage further comprising,
   - a load field effect transistor gated by said third phase clock signal for precharging the output storage capacitance to a first voltage level,
   - a two-terminal logical network having first and second terminals and comprising at least one field effect transistor having its gate electrode connected to said first-recited output for controlling the electrical impedance between said terminals,
   - an isolation field effect transistor connected between said second-recited output and said first terminal for isolating said second-recited output from said first terminal during said third phase clock signal, and for connecting said first terminal to said second-recited output during a fourth phase clock signal for evaluating inputs to said two-terminal logical network,
   - said second terminal being connected to said first phase clock signal for providing a second voltage level to said second terminal during said fourth phase clock signal whereby said second-recited output storage capacitance may be discharged to said second voltage level through said second-recited two-terminal logical network if a relatively low impedance exists between said first and second terminals of the second-recited two-terminal logic network during said fourth phase clock signal, whereby said first phase clock signal and said third phase clock signal are time shared by adjacent half-bit stages with each of said first and third phase clock signals providing different functions for each half-bit stage.

3. A compact multiple phase shift register comprising half-bit stages each having at least one input and an output including storage capacitance,
   - a load field effect transistor gated by a first phase clock signal for precharging the output capacitance,
   - a two-terminal logical network having first and second terminals and comprising at least one field effect transistor having its gate electrode connected to an input signal for controlling the electrical impedance between said terminals,
   - an isolation field effect transistor connected between said output and the first terminal of said two-terminal logical network for isolating the output from said first terminal during said first phase clock signal, and for connecting said first terminal to said output during a second phase clock signal for evaluating inputs to said logical network during said second phase clock signal, said second terminal being connected to a third phase clock signal, a half-bit stage adjacent to said first-recited half-bit stage comprising at least one input and an output, with one of its inputs being the output from said first-recited half-bit stage, the output of said adjacent half-bit stage including storage capacitance, said adjacent half-bit stage further comprising, a load field effect transistor gated by said third phase clock signal for precharging the output storage capacitance, a two-terminal logical network having first and second terminals and comprising at least one field effect transistor having its gate electrode connected to said first recited output for controlling the electrical impedance between said terminals, an isolation field effect transistor connected between said second-recited output and said first terminal for isolating said second-recited output from said first terminal during said third phase clock signal, and for connecting said first terminal to said second-recited output during a first phase clock signal for evaluating inputs to said two-terminal logical network, and said second terminal being connected to said first phase clock signal whereby said first phase clock signal and said third phase clock signal are time shared by adjacent half-bit stages with each of said first and third phase clock signals providing different functions for each half-bit stage, said adjacent half-bit stages comprise a single tier of a shift register, said shift register further including at least one additional tier of half-bit shift register stages, each half-bit stage of said additional tier having an input and an output including storage capacitance, and wherein the half-bit stage corresponding to the first-recited half-bit stage comprises, a two-terminal logical network having first and second terminals and comprising at least one field effect transistor having its gate electrode connected to an input signal for controlling the electrical impedance between said terminals, an isolation field effect transistor connected between said output and said first terminal for isolating said output from said first terminal during said first recited first phase clock signal, and for connecting said first terminal to said output during a second phase clock signal for evaluating inputs to said logical network, said third recited output being connected to said first-recited load field effect transistor, said first-recited load field effect transistor being time shared by said first-recited half-bit stage and by the third-recited half-bit stage of said additional tier.

4. The multiple tiered shift register recited in claim 3 further including a half-bit stage adjacent to said third-recited half-bit stage, and corresponding to said second-recited half-bit stage, said adjacent half-bit stage having an input and an output including storage capacitance, said output providing one input to said third-recited half-bit stage, said fourth-recited half-bit stage further comprising, a load field effect transistor gated by said third phase clock signal for precharging the output storage capacitance, a two-terminal logical network having first and second terminals and comprising at least one field effect transistor having its gate electrode connected to an input signal for controlling the electrical impedance between said terminals, an isolation field effect transistor connected between said output and said first terminal for isolating said output from said first terminal during said third phase clock signal, and for connecting said first terminal to said output during said fourth phase clock signal for evaluating the inputs to said logic function, said second terminal being connected to said second-recited second terminal, said second and fourth-recited half-bit stages time share said second terminal and said first phase clock signal.

5. The multiple tiered shift register recited in claim 4 wherein said shift register includes a plurality of tiers of shift register half-bit stages connected for time sharing clock signal lines and load field effect transistors.

6. A compact layout for a multiple phase shift register formed at least partly within a semiconductor substrate, said layout having at least two half-bit stages of one tier of shift register stages with each of said half-bit stages including, an output comprising a metal layer disposed over said semiconductor substrate and insulated therefrom, said metal layer forming a storage capacitance with the underlying semiconductor substrate, a first phase clock signal conductor disposed on said semiconductor substrate and insulated therefrom for providing a first phase clock signal to said multiple phase shift register, a third phase clock signal conductor disposed on said semiconductor substrate and insulated therefrom for providing a third phase clock signal to said multiple phase shift register, a first load field effect transistor having its gate electrode and one other electrode connected to said first phase clock signal conductor and its other electrode connected to said output for precharging the storage capacitance of said output during the first phase clock signal, a first two-terminal logical network having first and second terminals and comprising at least one field effect transistor having a gate electrode connected to an input conductor disposed on said substrate and insulated therefrom, a first isolation field effect transistor connected to said output conductor and gated by a second phase clock signal for isolating said two-terminal logical network from said output during said first phase clock signal and for connecting said output to said first terminal during said second phase clock signal for evaluating inputs to said logical network, said second terminal of said logical network being connected to said third phase clock signal conductor for enabling the charge of the output storage capacitance to discharge to the level of said third phase clock signal during said second phase clock signal, said phase clock signals being distinct from each other.

7. A compact layout for a multiple phase shift register formed at least partly within a semiconductor substrate, said layout having at least two half-bit stages of one tier of shift register stages with each of said half-bit stages comprising, an output metal layer disposed over said semiconductor substrate and insulated therefrom, said output metal layer including storage capacitance, a first phase clock signal conductor disposed on said semiconductor substrate and insulated therefrom for providing a first phase clock signal to said multiple phase shift register, a third phase clock signal conductor disposed on said semiconductor substrate and insulated therefrom for providing a third phase clock signal to said multiple phase shift register, a first load field effect transistor connected between said first phase clock signal conductor and said output conductor for precharging the capacitance of said output during the first phase clock signal, a first two-terminal logical network having first and second terminals and comprising at least one field effect transistor having a gate electrode connected to an input conductor disposed on said substrate and insulated therefrom, a first isolation field effect transistor connected to said output conductor and gated by a second phase clock signal for isolating said two-terminal logical network from said output during said first phase clock signal and for connecting said output to said first terminal during said second phase clock signal for evaluating inputs to said logical network, said second terminal of said logical network being connected to said third phase clock signal conductor for enabling the charge of the output storage capacitance to discharge to the level of said third phase clock signal during said second phase clock signal, said phase clock signals being distinct from each other, said field effect transistors of said multiple phase shift register comprise semiconductor regions of a different type of conductivity semiconductor material than the semiconductor material of said substrate, said field effect transistors having source and drain electrodes comprising metal layers disposed on said different conductivity regions, said source and drain electrodes being separated by a semiconductor region of said substrate, said region having a conducting metal layer deposited thereon for forming a gate electrode, and wherein the gate electrode of said first load field effect transistor includes a part of the first phase clock signal conductor, said first load field effect transistor having a different conductivity region deposited adjacent to said gate, said region extending to the output, said output including a metal layer which contacts said different conductivity region, said different conductivity region extending to said first isolation field effect transistor, said different conductivity region being interrupted by the gate electrode of said first isolation field effect transistor, said different conductivity region continuing on the other side of said gate electrode to the first terminal of said two-terminal logical network, said two-terminal logical network comprising at least one field effect transistor, said different conductivity region being separated by the gate electrode of said field effect transistor, said different conductivity region continuing on the other side of said gate electrode to the third phase clock signal conductor, said different conductivity region being connected to said third phase clock signal conductor by a metal contact.

8. The compact layout recited in claim 6 wherein said multiple phase shift register includes at least one adjacent tier of half-bit stages, with a first half-bit stage corresponding to the one-half-bit stage recited for said first load field effect transistor, said first load field effect transistor being time shared by the first one-half-bit stage of said adjacent tier.

9. The compact layout recited in claim 6 wherein said shift register includes an additional tier of one-half-bit shift register stages, said additional tier being adjacent to the third phase clock signal conductor, with said third phase clock signal conductor being time shared by the first one-half-bit stage of said additional tier adjacent to the third phase clock signal conductor of said first-recited one-half-bit stage.

10. The compact layout recited in claim 6 wherein said first and third clock signal conductors alternately include metal contacts to the underlying semiconductor region for providing electrical continuity between said phase clock signal conductors and the second terminals of said two-terminal logical networks being time shared by corresponding half-bit stages of adjacent tiers and include insulated conductor regions for forming gates for said load field effect transistors being time shared by corresponding half-bit stages of adjacent tiers of said multiple phase shift register.

* * * * *

PO-1050
(5/69)

UNITED STATES PATENT OFFICE
CERTIFICATE OF CORRECTION

Patent No. 3,631,261 Dated December 28, 1971

Inventor(s) Gary L. Heimbigner

It is certified that error appears in the above-identified patent and that said Letters Patent are hereby corrected as shown below:

Column 8, Claim 2, line 30, delete "precharging" and insert --an--.

Signed and sealed this 30th day of May 1972.

(SEAL)
Attest:

EDWARD M.FLETCHER,JR.
Attesting Officer

ROBERT GOTTSCHALK
Commissioner of Patents